United States Patent
Geraty

(10) Patent No.: US 10,086,724 B2
(45) Date of Patent: Oct. 2, 2018

(54) PARTITION ASSEMBLY FOR A VEHICLE SEAT

(71) Applicant: Inova Products, Inc., Tualatin, OR (US)

(72) Inventor: Thomas Geraty, San Jose, CA (US)

(73) Assignee: Inova Products, Inc., Tualatin, OR (US)

( * ) Notice: Subject to any disclaimer, the term of this patent is extended or adjusted under 35 U.S.C. 154(b) by 167 days.

(21) Appl. No.: 15/171,831

(22) Filed: Jun. 2, 2016

(65) Prior Publication Data

US 2016/0355109 A1    Dec. 8, 2016

Related U.S. Application Data

(60) Provisional application No. 62/169,765, filed on Jun. 2, 2015.

(51) Int. Cl.
  *B60N 2/44*    (2006.01)
  *B60N 2/90*    (2018.01)

(52) U.S. Cl.
  CPC .............. *B60N 2/44* (2013.01); *B60N 2/90* (2018.02); *B60N 2/91* (2018.02); *B60N 2002/905* (2018.02)

(58) Field of Classification Search
  CPC .. B60N 2/441; B60N 2/44; B60N 2002/4405; B60N 2/90; B60N 2/91; B60N 2002/905; B60R 7/043
  See application file for complete search history.

(56) References Cited

U.S. PATENT DOCUMENTS

| | | | | |
|---|---|---|---|---|
| 2,633,180 A | * | 3/1953 | Reed | B60N 2/4673 224/275 |
| 4,146,159 A | * | 3/1979 | Hemmen | B60N 2/4673 224/275 |
| 5,054,837 A | * | 10/1991 | Chapman | B60N 2/28 160/351 |
| 5,123,707 A | | 6/1992 | Wurzell | |
| 5,255,958 A | | 10/1993 | Frischmann | |
| 5,971,487 A | * | 10/1999 | Passehl | B60N 2/28 108/44 |
| 6,142,574 A | | 11/2000 | Alexander | |
| 6,260,903 B1 | | 7/2001 | von der Heyde | |
| 6,405,909 B1 | * | 6/2002 | Burnett | B60R 7/043 211/64 |
| 6,669,259 B2 | * | 12/2003 | Murray | B60R 7/14 296/24.46 |
| 7,669,907 B2 | | 3/2010 | Spater et al. | |

(Continued)

FOREIGN PATENT DOCUMENTS

WO    WO-2013039497 A1    3/2013

*Primary Examiner* — David R Dunn
*Assistant Examiner* — Tania Abraham
(74) *Attorney, Agent, or Firm* — Schwegman Lundberg & Woessner, P.A.

(57) ABSTRACT

A partition assembly for a motor vehicle seat comprises a stabilizer sub-assembly configured to connect to the motor vehicle seat, and a panel sub-assembly connected to the stabilizer sub-assembly. The stabilizer sub-assembly can comprise one or more flexible rods connected to a headrest. The panel sub-assembly can comprise a fabric or rigid sheet braced by a plurality of flexible rods. Additionally, the partition assembly can further comprise a strap connected to the panel sub-assembly for wrapping around a bottom of the vehicle seat.

17 Claims, 13 Drawing Sheets

(56) References Cited

U.S. PATENT DOCUMENTS

| | | |
|---|---|---|
| 7,717,484 B2 | 5/2010 | Parle et al. |
| 8,272,674 B2 | 9/2012 | Vance |
| 8,720,991 B2 | 5/2014 | Macleod et al. |
| 2011/0227391 A1 | 9/2011 | Cahall et al. |
| 2013/0328357 A1 | 12/2013 | Macleod et al. |
| 2015/0145307 A1* | 5/2015 | Arriola ................ B60N 2/4879 297/397 |

* cited by examiner

PARTITION ASSEMBLY FOR A VEHICLE SEAT

PRIORITY

This Application claims the benefit of U.S. Provisional Application 62/169,765, filed Jun. 2, 2015, which application is incorporated by reference herein its entirety.

TECHNICAL FIELD

This patent document pertains generally to motor vehicle interiors, and more particularly, but not by way of limitation, to a partition assembly for a vehicle seat.

BACKGROUND

Many designs have been developed for providing a divider between seats in a vehicle for various purposes. Some such designs are described in the following publications: U.S. Pat. Nos. 5,123,707, 5,255,958, 5,971,487, 6,142,574, 6,260,903, 7,669,907, 7,717,484, 8,272,674, 8,720,991, U.S. 2011/0227391, U.S. 2013/0328357, and WO 2013/039497.

The designs described in these publications, however, are lacking in one or more ways for a variety of reasons, particularly in the area of consumer passenger vehicles.

BRIEF DESCRIPTION OF DRAWINGS

Some embodiments are illustrated by way of example and not limitation in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present invention may be practiced without these specific details.

Exemplary features of a partition assembly for a motor vehicle seat in accord with the present disclosure are shown in FIGS. 1-8E of the Drawings. The partition assembly illustrated in the attached Drawings represents several exemplary partition assemblies in accordance with the present patent application. Numerous other configurations that provide similar functionality are also contemplated.

Figure 1:
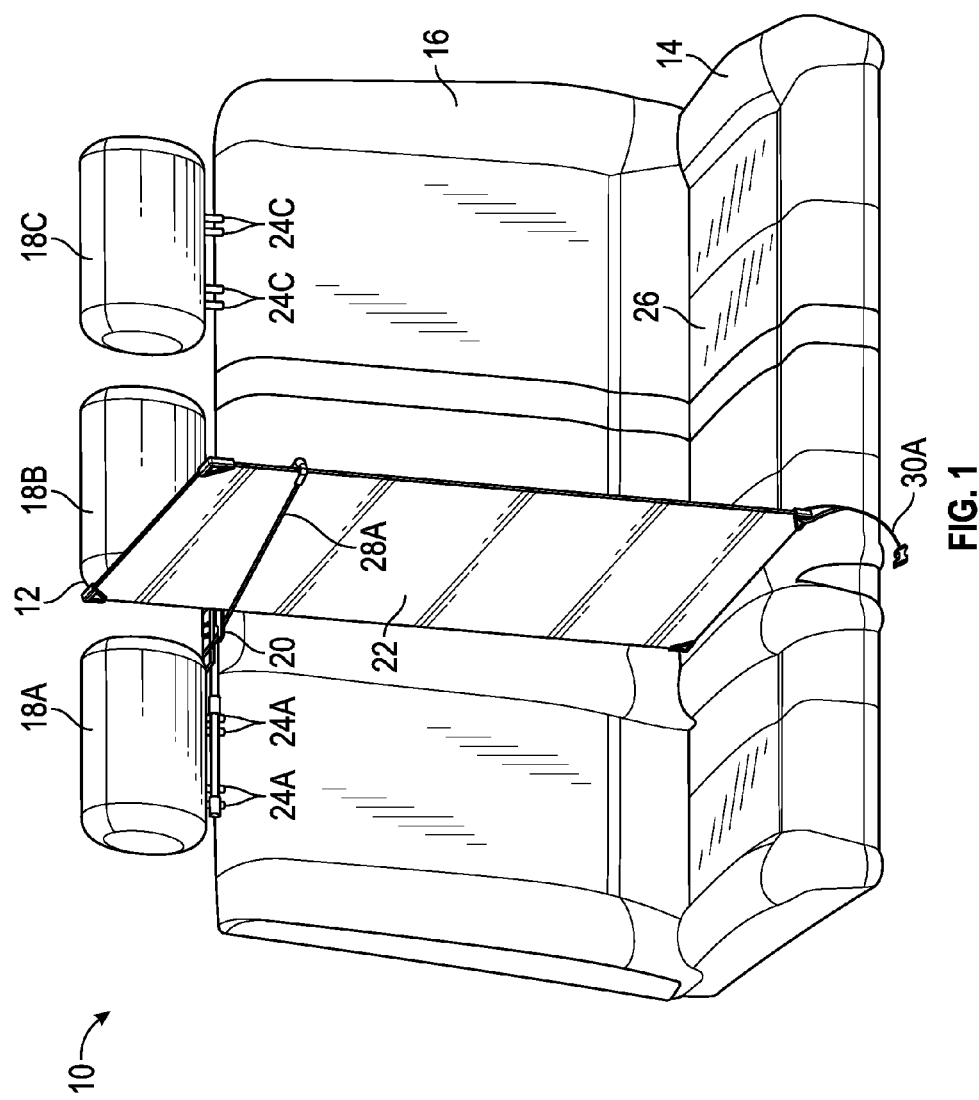
FIG. 1 is a front perspective view of a vehicle seat having installed therein a partition assembly of the present disclosure.

FIG. 1 is a front perspective view of vehicle seat 10 having installed therein partition assembly 12 of the present disclosure. Vehicle seat 10 can include seat bottom 14, backrest 16 and headrests 18A, 18B and 18C. Partition assembly 12 can include stabilizer sub-assembly 20 and panel sub-assembly 22.

Vehicle seat 10, in the example illustrated, can comprise a bench seat to accommodate multiple passengers. Configured as such, seat bottom 14 and backrest 16 can have enough width for three seating positions, one of each at headrest 18A, headrest 18B and headrest 18C. Headrests 18A-18C can be connected to backrest 16 via headrest posts, such as post 24A, 24B (FIGS. 7A-7C) and 24C, respectively. Backrest 16 can be connected to seat bottom 14 at a pivoting connection such that the angle of backrest 16 relative to seat bottom 14 can be varied. As such, backrest 16 and seat bottom 14 can be separate components disposed adjacent to each other at bite line 26.

Partition assembly 12 can be mounted to vehicle seat 10 in order to provide a privacy screen between seating positions of seat bottom 14 and backrest 16. In one example, partition assembly 12 can be mounted to the side of one headrest in order to provide a screen between two seating positions, as is depicted in FIG. 1, thereby dividing vehicle seat 10 into one-third and two-thirds portions (see FIGS. 7A-7C). In another example, partition assembly 12 can be mounted in the middle of one headrest in order to provide a screen in the middle of a seating position, thereby dividing vehicle seat 10 into two half portions (see FIGS. 8A-8E).

Stabilizer sub-assembly 20 can be configured to mount to a headrest. In one example, stabilizer sub-assembly 20 can mount to posts 24A of headrest 18A. Stabilizer sub-assembly 20 can include support rods 28A and 28B (FIG. 2) that support panel sub-assembly 22 in an upright position. Straps 30A and 30B (FIG. 7A) can be configured to connect panel sub-assembly 22 to seat bottom 14. As will be discussed below, partition assembly 12 can provide a lightweight, easy to install divider between seating positions, and therefore occupants, of said seating positions, of bench 14 and backrest 16.

Figure 2:
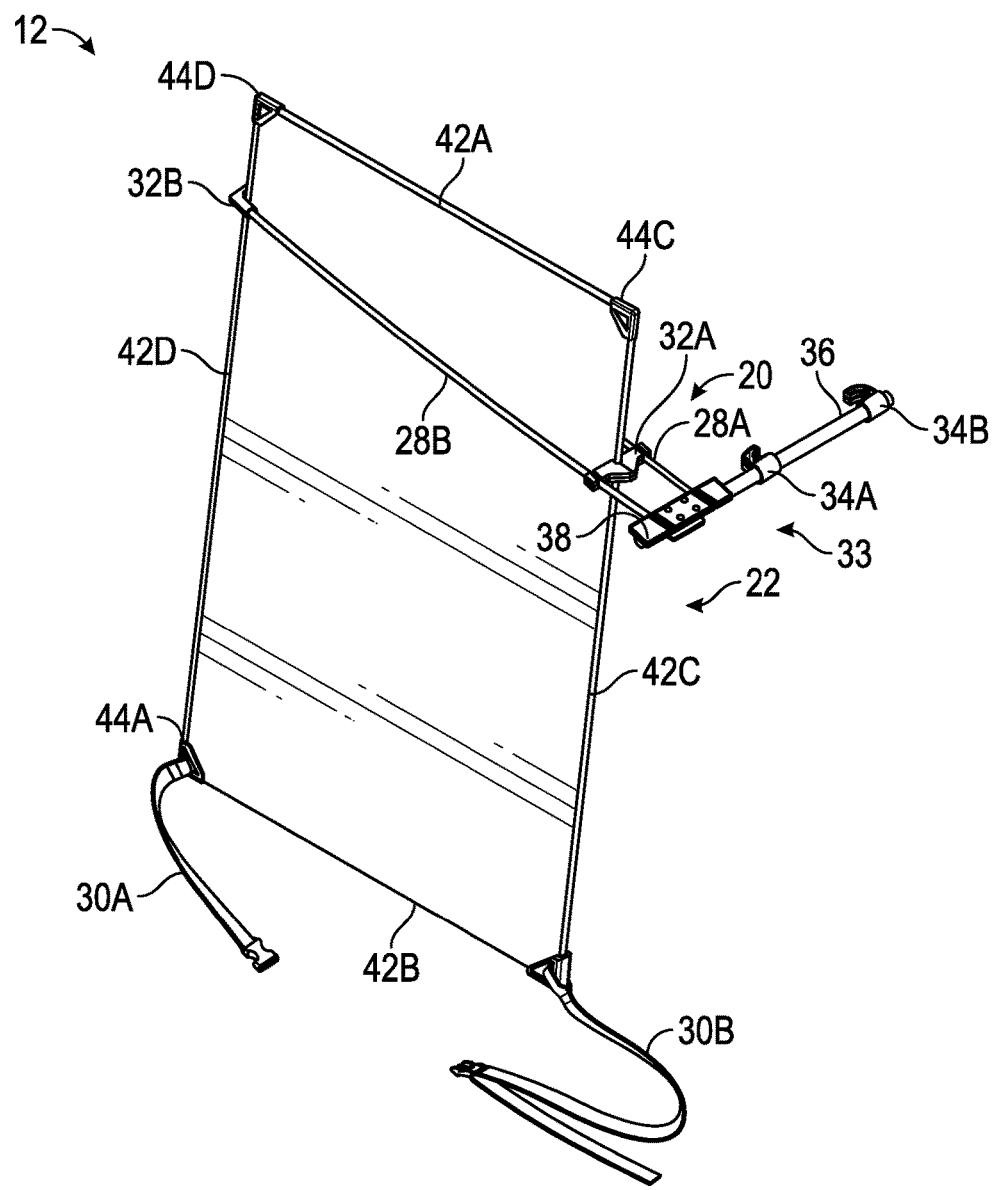
FIG. 2 is a side perspective view of the partition assembly of FIG. 1 showing a stabilizer sub-assembly and a panel sub-assembly.
Figure 3:
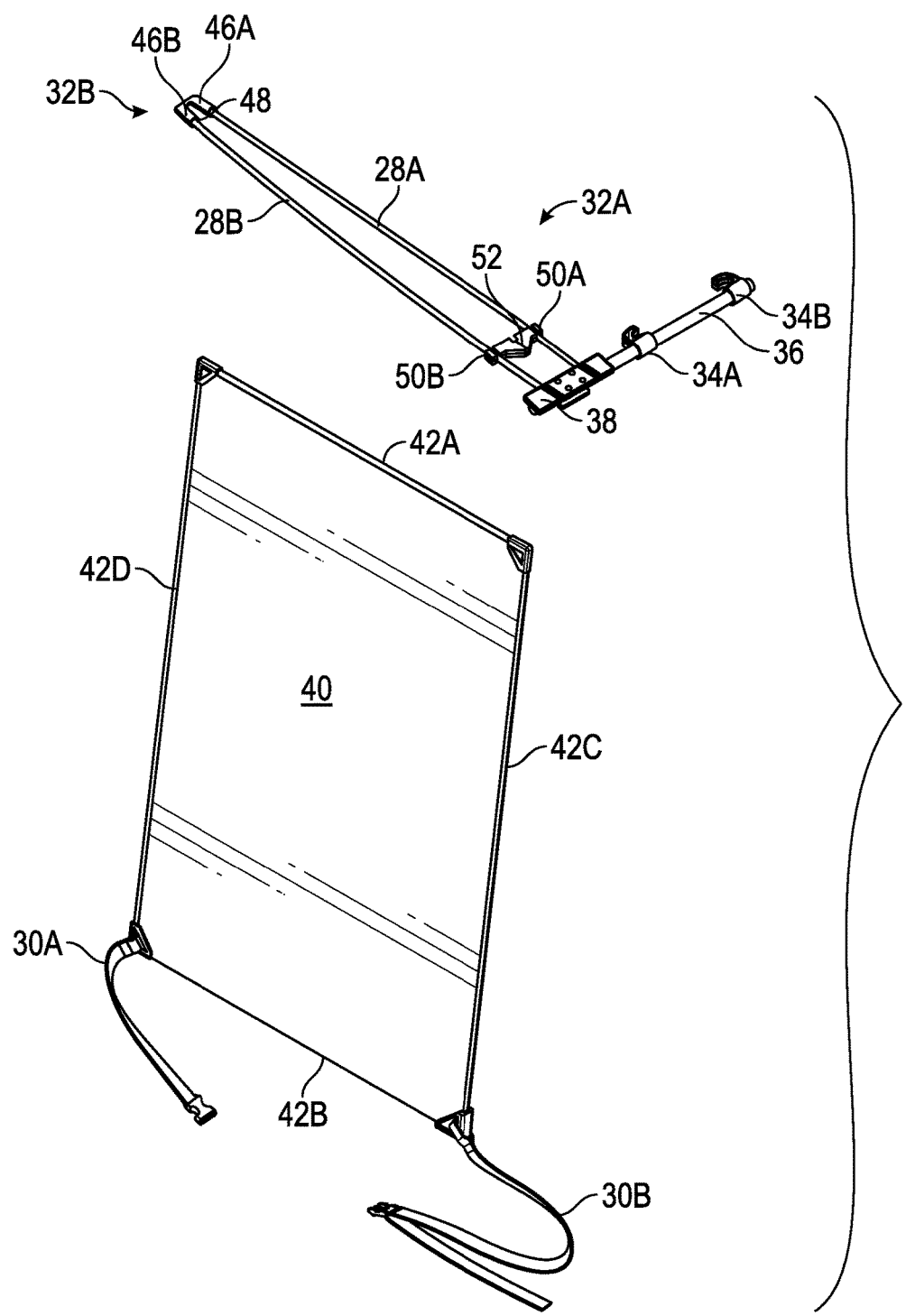
FIG. 3 is a side perspective view of the partition assembly of FIG. 2 showing the stabilizer sub-assembly exploded from the panel sub-assembly.
Figure 4A:
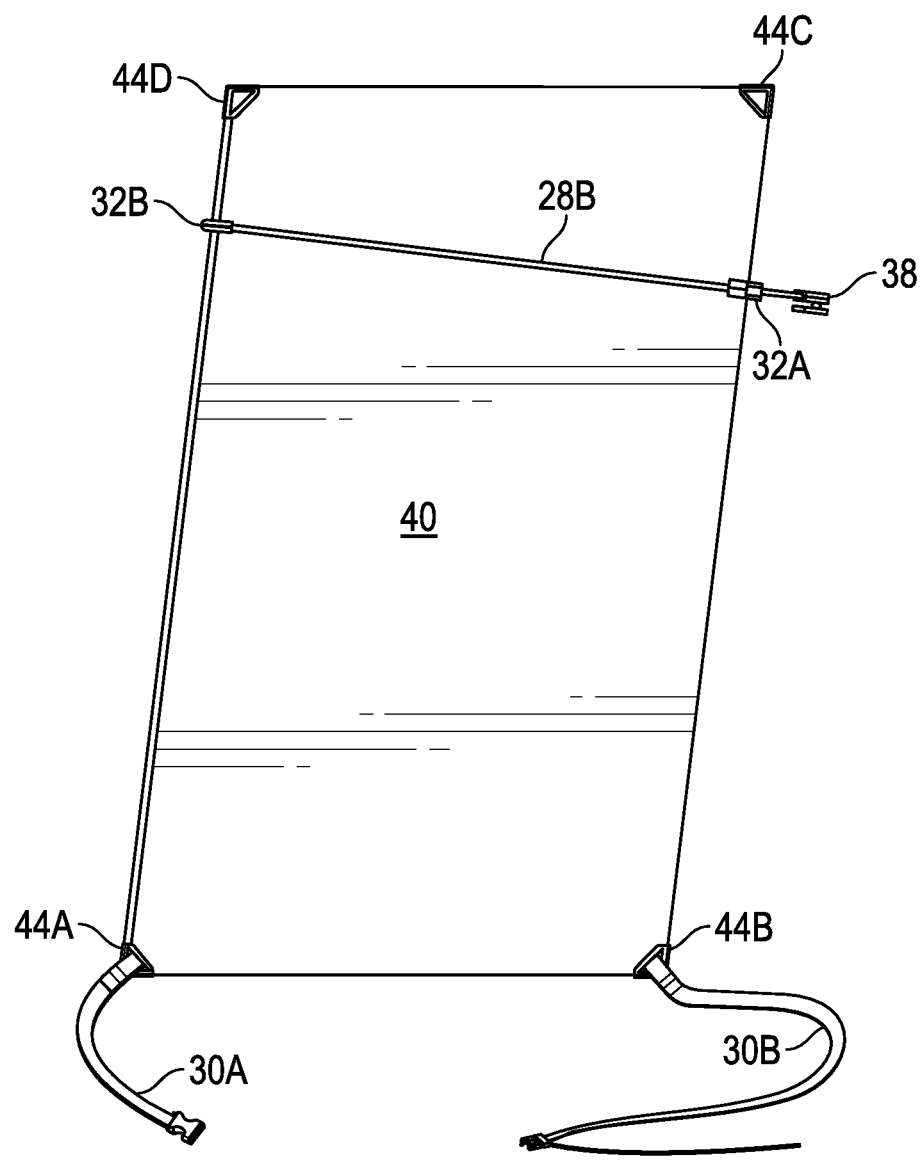
FIG. 4A is a side view of the partition assembly of FIG. 2.
Figure 4B:
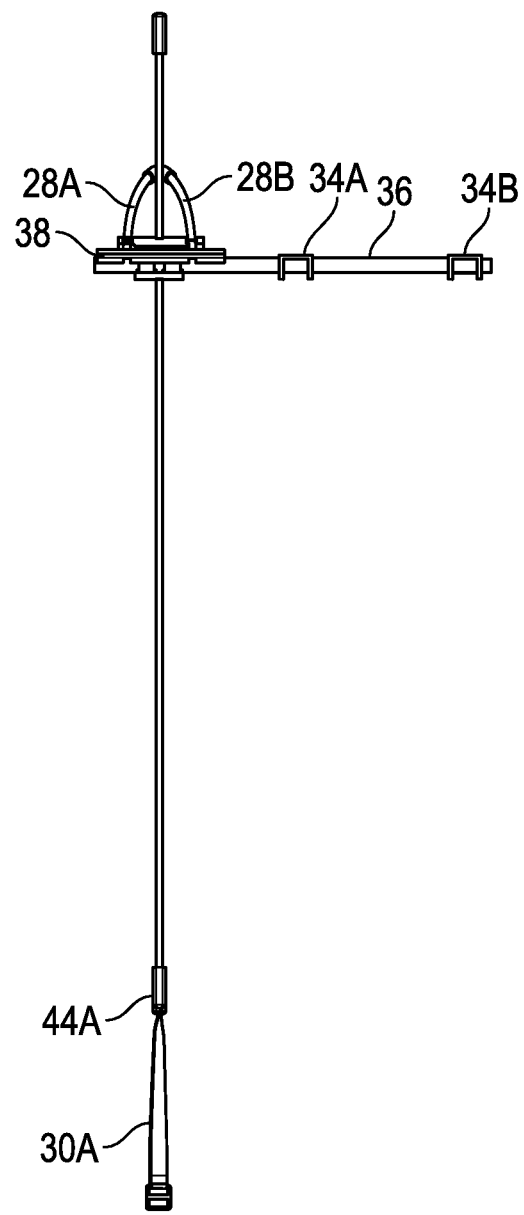
FIG. 4B is a rear view of the partition assembly of FIG. 4A.
Figure 4C:
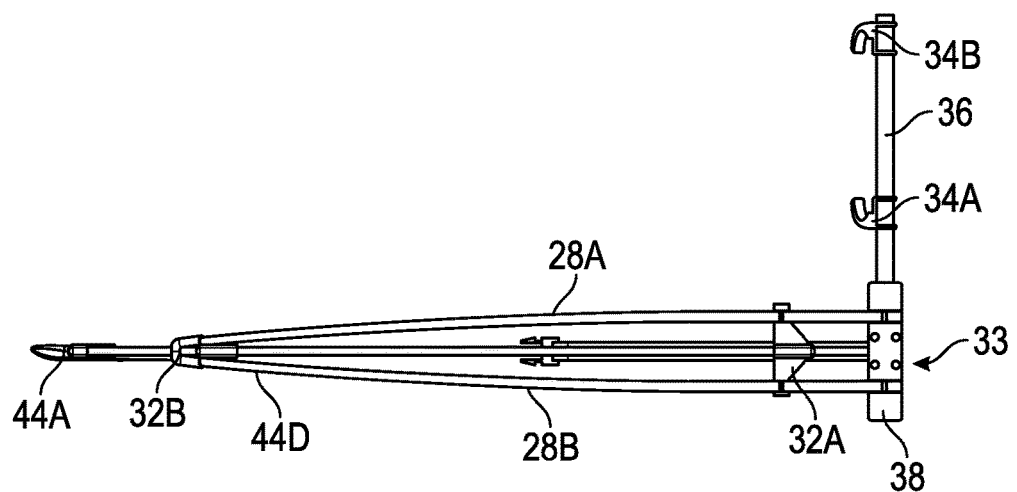
FIG. 4C is a top view of the partition assembly of FIG. 4A.

FIG. 2 is a side perspective view of partition assembly 12 of FIG. 1 showing stabilizer sub-assembly 20 and panel sub-assembly 22. FIG. 3 is a side perspective view of partition assembly 12 of FIG. 2 showing stabilizer sub-assembly 20 exploded from panel sub-assembly 22. FIG. 4A is a side view of partition assembly 12 of FIG. 2. FIG. 4B is a rear view of partition assembly 12 of FIG. 4A. FIG. 4C is a top view of partition assembly 12 of FIG. 4A. FIGS. 2-4C are discussed concurrently. FIGS. 2-4C illustrate an example of a partition assembly of the present disclosure. However, other partition assembly constructions can be embodied that achieve the same or similar functionality within the scope of the present disclosure.

Stabilizer sub-assembly 20 can include rods 28A and 28B that can extend between a proximal connection end at proximal stabilizer 32A and a distal support end at distal stabilizer 32B. Stabilizer sub-assembly 20 can also include clamp 33, which can include clamp jaws 34A and 34B and brace rod 36, and mount block 38. Panel sub-assembly 22 can include straps 30A and 30B, sheet 40, rods 42A, 42B, 42C and 42D, and corner braces 44A, 44B, 44C and 44D.

Stabilizers 32A and 32B can connect rods 28A and 28B to form an elongate frame that can circumscribe panel sub-assembly 22 in conjunction with clamp 33. In other embodiments, panel sub-assembly 22 need not be completely circumscribed by stabilizers 32A and 32B and clamp 33. Distal stabilizer 32B can include two sockets 46A, 46B for receiving ends of rods 28A and 28B. Sockets 46A, 46B can be positioned on either side of notch 48, which can connect to rod 42D. Proximal stabilizer 32A can include two sockets 50A, 50B for receiving ends of rods 28A and 28B. Sockets 50A, 50B can be positioned on either side of a notch 52, which can connect to rod 42C.

Mount block 38 can connect brace rod 36 to rods 28A and 28B at a first end. A second end of brace rod 36 can be connected to clamp jaws 34A and 34B. Clamp jaws 34A and 34B can be configured to connect to an upper portion of a vehicle seat, such as to posts of a headrest. Thus, mount block 38 can cantilever rods 28A and 28B from brace rod 36, and stabilizers 32A and 32B can suspend panel sub-assembly 22 from rods 28A and 28B. Additionally, straps 30A and 30B can be used to secure panel sub-assembly 22 to a lower portion of a vehicle seat, such as by passing around or circumscribing (with bottom rod 42B) seat bottom 14.

Figure 5:
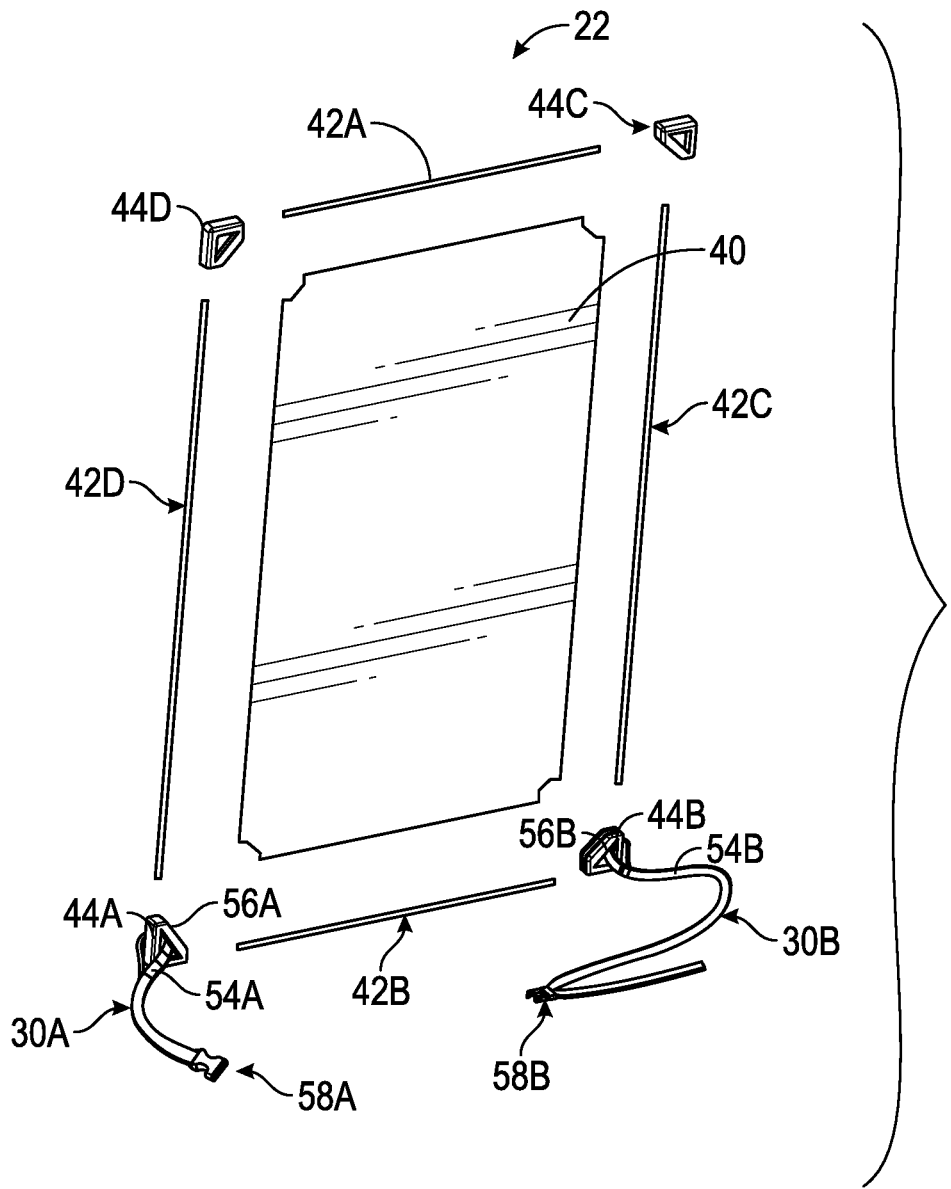
FIG. 5 is an exploded view of the panel sub-assembly of FIG. 3.

FIG. 5 is an exploded view of panel sub-assembly 22 of FIG. 3. Corner braces 44A-44D can be configured to receive ends of rods 42A-42D to form a frame-like structure. Rods 42A-42D can be secured in braces 44A-44D via a force fit connection or by other means such as fasteners. For example, corner brace 44A can include two bores disposed ninety degrees to each other for receiving ends of rods 42D and 42B. Other means for joining rods can also be used such as clamps or brackets. In other examples, rods 44A-44D can be made from a single continuous rod that is bent into the desired shape. All four corner braces 44A-44D can be similarly configured such that sheet 40 can be held in a rectilinear configuration, as is shown in the illustrated embodiment. Panel sub-assembly 22 need not have a rectilinear shape in other embodiments. For example, panel sub-assembly 22 can be oval, square, round or have other rectilinear or irregular shapes. As such, in other examples, more than four rods 28 or fewer than four rods 28 can be used. For example, bottom rod 42B can be omitted, or side rods 42D and 42C can be omitted and sheet 40 can drape freely from upper rod 42A. In one embodiment, corner braces 44A-44D can be fabricated from a polymer material such as injection molded PCABS (Poly Carbonate-Acrylonitrile Butadiene Styrene alloy). However, corner braces 44A-44D can be fabricated from any other suitable material such as aluminum, steel or the like. In one embodiment, rods 42A-42D can be fabricated from flexible fiberglass poles. However, rods 42A-42D can be fabricated from any other suitable material, such as a polymer or plastic, aluminum, steel or the like.

Sheet 40 can be sewn to rods 42A-42D. For example, sheet 40 can be slightly taller and wider than the frame formed by rods 42A-42D such that sheet 40 can be folded around rods and sewn together to form four sleeves for receiving rods 42A-42D. In other words, rods 42A-42D can be inserted into sleeves in sheet 40. In other examples, sleeves of a separate material can be sewn to sheet 40. In still other examples, sheet 40 can be attached to rods 42A-42D by other means, such as adhesive, fasteners and hook and loop fastener material. Sheet 40 can provide a privacy barrier, such as a screen or curtain, between seating positions of seat 10. In one embodiment, sheet 40 can be fabricated from nylon fabric. Sheet 40, however, can be fabricated from any other suitable material, such as cotton fabric, polyester, closed-cell extruded polystyrene foam, polyurethane foam, and the like. Sheet 40 can be fabricated from a material that is easy to clean, such as vinyl or leather. In other embodiments, sheet 40 can be provided with window, or can be made of a transparent material, that can be covered with a flap. In other embodiments, sheet 40 can be provided with decorative illustrations, designs or pictures. In yet other embodiments, sheet 40 can be formed of a rigid or semi-rigid material, such as a plastic sheet or a shaded poly (methyl methacrylate) (PMMA) plank.

Straps 30A and 30B can include loop 54A and loop 54B, respectively, for connecting to another portion of panel sub-assembly 22. For example, each loop 54A, 54B can connect to one of rods 42A-42D. In the illustrated example, loop 54A of strap 30A can connect to slot 56A in corner brace 44A, and loop 54B of strap 30B connects to slot 56B in corner brace 44B. In other examples, loops 54A and 54B can be connected directly to rod 42B. In other examples, a single strap that extends between corner braces 44A and 44B can be used. Straps 30A and 30B can also include fastener components 58A and 58B for connecting straps 30A and 30B together. In the illustrated example, fastener component 58A comprises a female portion of a buckle clip, while fastener component 58B comprises a male portion of a buckle clip. However, other suitable fastener components can be used, such as spring clips, drawstring clips or the like. Straps 30A and 30B can be connected to fastener components 58A and 58B, respectively, in such a manner that they can be drawn or cinched to tighten around seat bottom 14. In one embodiment, fastener components 58A and 58B are fabricated from a polymer material. Fastener components 58A and 58B can be fabricated from other suitable materials such as metal. In one embodiment, straps 30A and 30B are fabricated from nylon webbing. Straps 30A and 30B can be fabricated from other suitable materials such as cotton or other natural materials or other synthetic materials. In another example, straps 30A and 30B can be made from an elastic material. In another embodiment, fastener components 58A and 58B can comprise hook and loop fastener material or some other closure device.

Figure 6A:
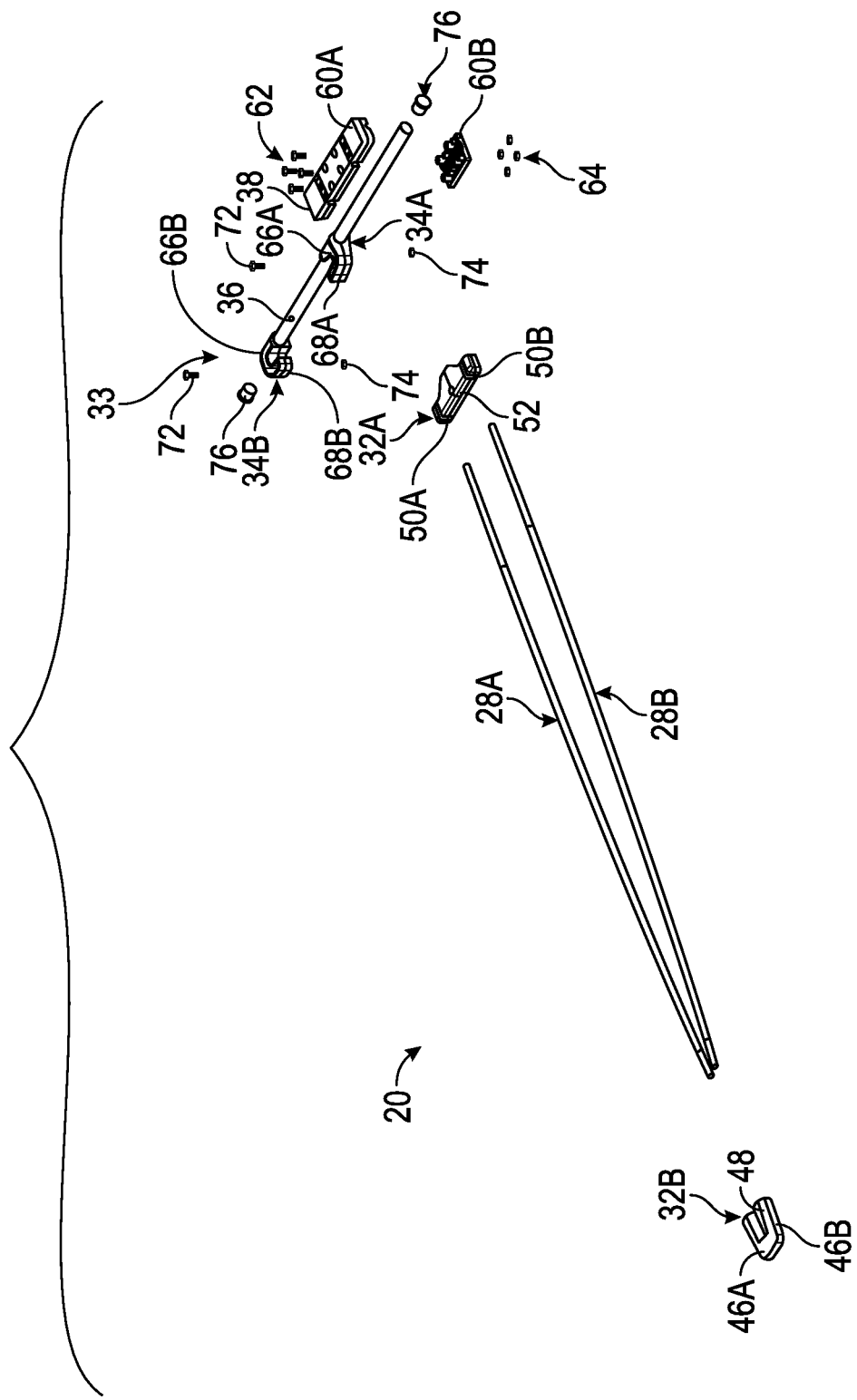
FIG. 6A is an exploded view of the stabilizer sub-assembly of FIG. 3.
Figure 6B:
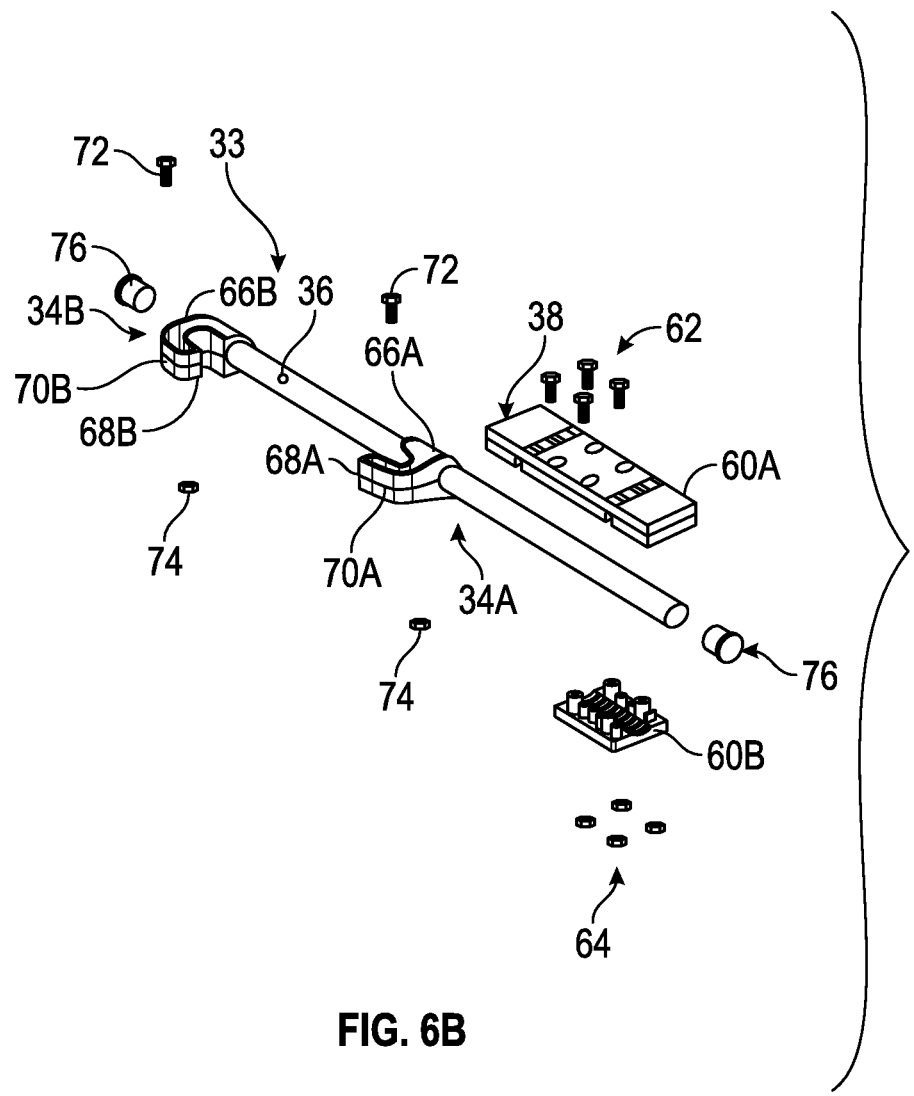
FIG. 6B is a close-up view of the stabilizer sub-assembly of FIG. 6A showing a clamp and a mount block.

FIG. 6A is an exploded view of stabilizer sub-assembly 20 of FIG. 3. FIG. 6B is a close-up view of stabilizer sub-assembly 20 of FIG. 6A showing clamp 33, which can include jaws 34A and 34B and brace rod 36, and mount block 38. Mount block 38 can include upper portion 60A and lower portion 60B.

Stabilizer 32A can include sockets 46A and 46B for receiving distal ends of rods 28A and 28B, respectively. Notch 48 can connect to rod 42D of panel sub-assembly 22 (FIG. 5). Stabilizer 32B can include sockets 50A and 50B for receiving proximal portions of rods 28A and 28B, respectively. Notch 52 can connect to rod 42C of panel sub-assembly 22 (FIG. 5). In one embodiment, stabilizers 32A and 32B can be fabricated from a polymer material such as injection molded PCABS (Poly Carbonate-Acrylonitrile Butadiene Styrene alloy). However, stabilizers 32A and 32B can be fabricated from any other suitable material such as such as aluminum, steel or the like. In one embodiment, rods 28A and 28B can be fabricated from flexible fiberglass poles. However, rods 28A and 28B can be fabricated from any other suitable material, such as polymer or plastic, aluminum, steel or the like.

Figure 7A:
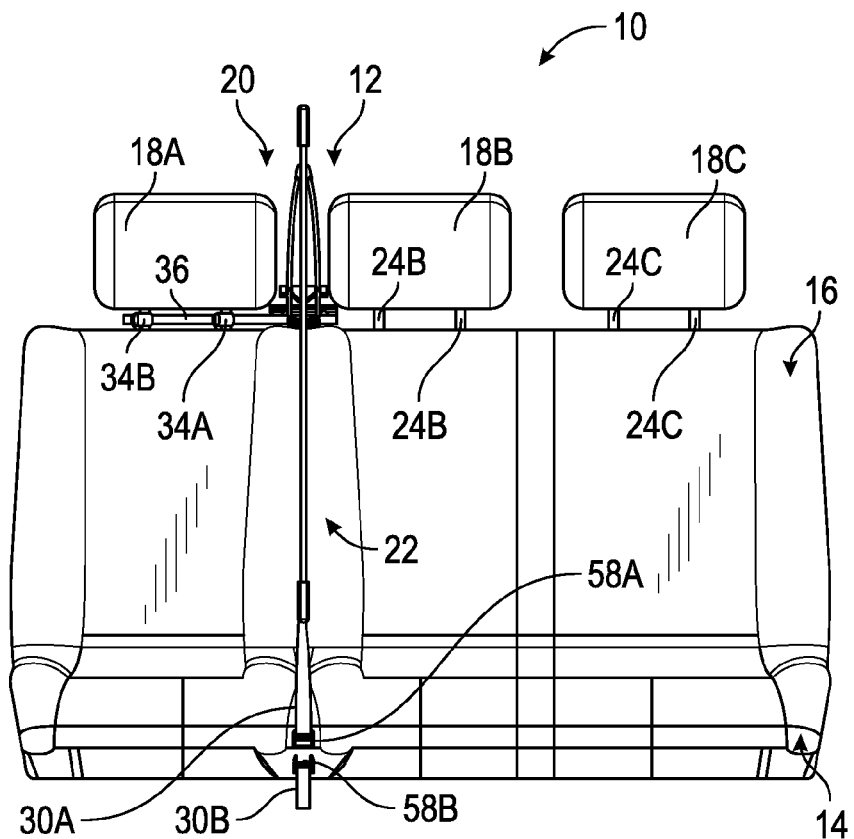
FIG. 7A is a front view of the vehicle seat of FIG. 1 showing the stabilizer sub-assembly connected to headrest support posts in between seating positions and showing a first strap in position to join with a second strap of the partition assembly.
Figure 7B:
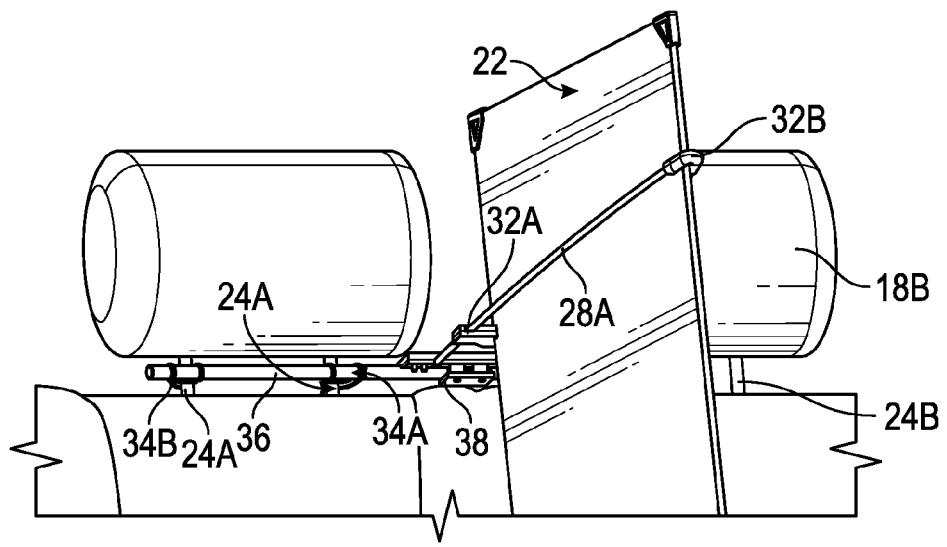
FIG. 7B is a close-up of a front perspective view of the vehicle seat of FIG. 7A having the stabilizer sub-assembly connected to headrest support posts.
Figure 7C:
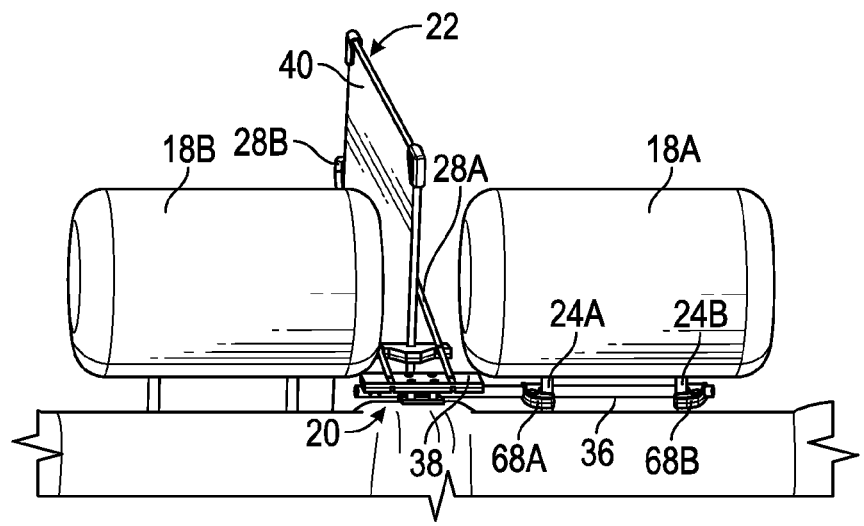
FIG. 7C is a close-up of a rear perspective view of the vehicle seat of FIG. 7A showing the stabilizer sub-assembly connected to headrest support posts.

Upper portion 60A and lower portion 60B of mount block 38 can connect to proximal ends of rods 28A and 28B, proximally of stabilizer 32B. Portions 60A and 60B can be connected to each other using a variety of means, such as threaded fasteners 62 that can extend through upper portion 60A to connect to inserts 64 in lower portion 60B. Fasteners 62 can be any suitable type of fasteners, including pins, screws, bolts and the like. Fasteners 62 can also have any suitable type of drive feature, including Philips head, hex head, slotted head, thumb screw head and the like. Portions 60A and 60B can come together to surround or partially surround brace rod 36. Mount block 38 can be positioned near an end of brace rod 36 so that clamp jaws 34A and 34B are both to one side of mount block 38 for installing partition assembly 12 in between seating positions (FIGS. 7A-7C). Alternatively, mount block 38 can be positioned on brace rod 36 between clamp jaws 34A and 34B for installing partition assembly 12 in or near the center of a seating position (FIGS. 8A-8E). In one embodiment, mount block 38 can be fabricated from a polymer material such as injection molded PCABS (Poly Carbonate-Acrylonitrile Butadiene Styrene alloy), although other suitable materials can be used. In one embodiment, brace rod 36 can comprise a hollow rod fabricated from 6061 aluminum tubing, although other suitable materials can be used.

Clamp jaws 34A and 34B can include sockets 66A and 66B, respectively, for receiving brace rod 36. Clamp jaws 34A and 34B can also include hooks 68A and 68B, respectively, that extend from sockets 66A and 66B. Sockets 66A and 66B and hooks 68A and 68B can include slits 70A and 70B that allow clamp jaws 34A and 34B to expand and contract to control the tightness of the engagement with brace rod 36. As such, jaws 34A and 34B can be slid into a desired position on brace rod 36 when the slits are opened. To lock jaws 34A and 34B in place on brace rod 36, threaded fasteners 72 can extend through hooks 68A and 68B to engage nuts 74, thereby closing or partially closing the slits. Fasteners 72 can be any suitable type of fasteners, including pins, screws, bolts and the like. Fasteners 72 can also have any suitable type of drive feature, including Philips head, hex head, slotted head, thumb screw head and the like. Although, in other embodiments, other means or permitting jaws 34A and 34B to slide and lock on brace rod 36 can be used. For example, detent mechanisms, ratchet mechanisms, telescoping mechanisms and the like can be used to allow jaws 34A and 34B to move relative to each other. Brace rod 38 can also be provided with end caps 76. In one embodiment, clamp jaws 34A and 34B are fabricated from a polymer material such as injection molded PCABS (Poly Carbonate-Acrylonitrile Butadiene Styrene alloy), although other suitable materials can be used.

FIG. 7A is a front view of vehicle seat 10 of FIG. 1 (except headrests 18A-18C include only two of posts 24A-24C each, respectively). FIG. 7B is a close-up of a front perspective view of vehicle seat 10 of FIG. 7A having stabilizer sub-assembly 20 connected to headrest support posts 24A. FIG. 7C is a close-up of a rear perspective view of vehicle seat 10 of FIG. 7B showing stabilizer sub-assembly 20 connected to headrest support posts 24A. FIGS. 7A-7C show partition assembly 12 installed between seating positions for headrest 18A and 18B.

FIG. 7A shows second strap 30B in position to join with first strap 30A of partition assembly 12. Second strap 30B can extend from between seat bottom 14 and seat backrest 16 at bite line 26 (See FIG. 8E). Fastener components 58B and 58A can be disposed proximate to each other to facilitate connection. For example, mating male and female buckle components can be engaged to join straps 30A and 30B. After components 58B and 58A are coupled together, strap 34B can be drawn tight to secure a lower portion of panel sub-assembly 22 to seat bottom 14.

FIGS. 7A and 7B show brace rod 36 connected to posts 24A via jaws 34A and 34B of clamp 33. Sockets 66A and 66B can be positioned on brace rod 36 so that hooks 68A and 68B engage posts 24A. Brace rod 36 can extend outward of headrest 18A and can be joined to rods 28A and 28B via mount block 38. Rods 28A and 28B can extend distally from mount block 38 so as to be cantilevered from brace rod 36. Rods 28A and 28B can be connected to stabilizers 32A and 32B, which allow for panel sub-assembly 22 to be suspended from rods 28A and 28B. In particular, stabilizers 32A and 32B can engage rods 42C and 42D, respectively, such as via a snap fit or other suitable means.

A method for installing partition assembly 10 can include: positioning clamp 33 adjacent headrest posts 24A, sliding clamp jaws 34A and 34B along brace rod 36 to secure clamp jaws 34A and 34B to posts 24A, tightening fasteners in clamp jaws 34A and 34B to immobilize clamp jaws 34A and 34B on brace rod 36, connecting stabilizers 32A and 32B to rods 28A and 28B, positioning ends proximal ends of rods 28A and 28B within mount block 38; positioning mount block 38 around brace rod 36, securing fasteners 62 to portions 60A and 60B of mounting block 38 to immobilize mounting block 38 on brace rod 36, inserting rods 42A-42D into corner braces 44A-44D to form panel sub-assembly 22, inserting panes sub-assembly 22 between rods 28A and 28B, and connecting rods 42C and 42D into stabilizers 32A and 32B.

Figure 8A:
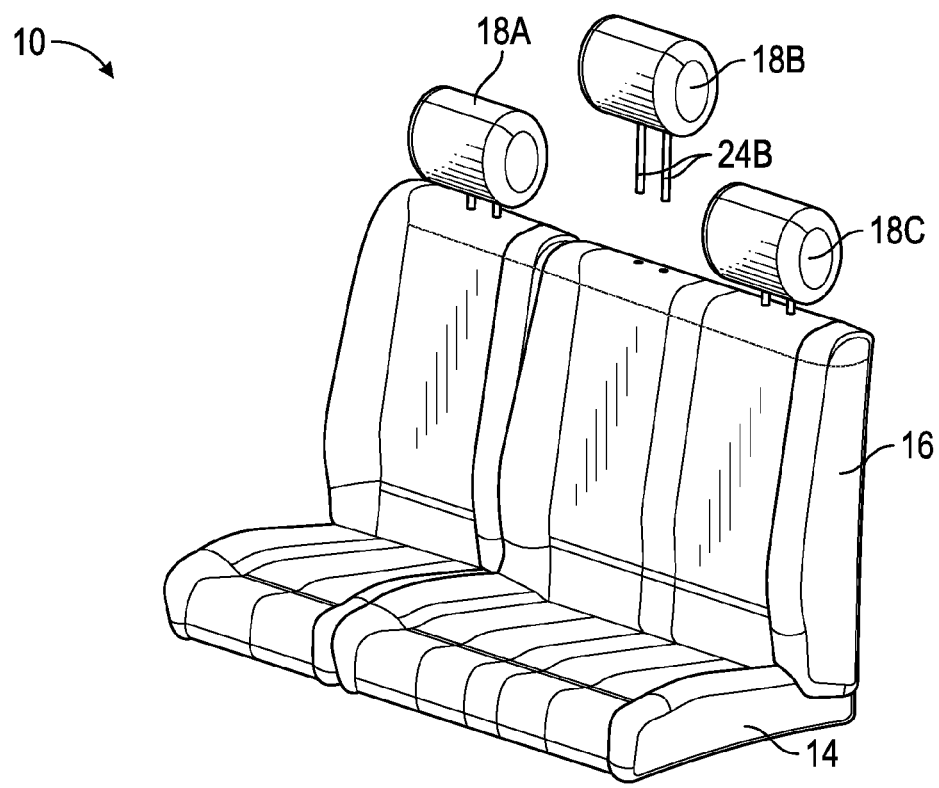
FIG. 8A is a front perspective view of the vehicle seat of FIG. 1 having a middle headrest exploded therefrom.

FIG. 8A is a front perspective view of a vehicle seat 10 of FIG. 1 having headrest 18B exploded therefrom. Headrest 18B can include posts 24B. In the illustrated example, two posts 24B can be provided on headrest 18B. However, in other examples, headrest 18B can include four posts, such as is shown in FIG. 1. A method of installing partition assembly 12 of the present disclosure can include: Step 1 of removing center headrest 18B. Such a step can include withdrawing posts 24B from sockets in backrest 16. However, in other examples, headrests 18A or 18C can be removed from backrest 16 in order to install partition assembly 12.

Figure 8B:
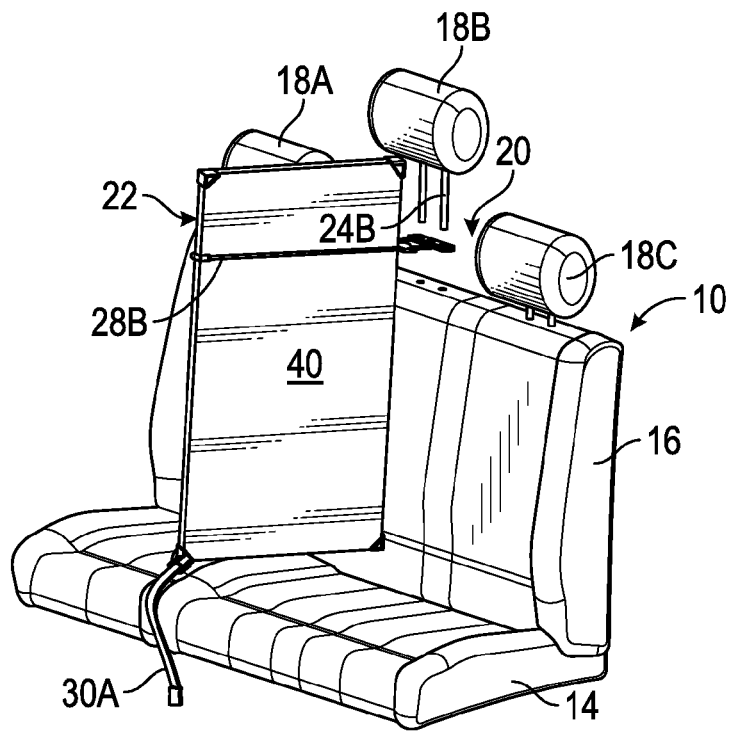
FIG. 8B is a front perspective view of the vehicle seat of FIG. 8A with a partition assembly configured for installation in the center of a middle seating position.

FIG. 8B is a front perspective view of vehicle seat 10 of FIG. 8A with partition assembly 12 configured for installation in the center of a seating position beneath headrest 18B. As such, mount block 38 can be positioned between clamp jaws 34A and 34B. However, as discussed above, clamp jaws 34A and 34B can be positioned on brace rod 36 to one side of mount block 38. In other embodiments, mount block 38 can be mounted directly to rods 24B, such as by removal of headrest 18B and then insertion of rods 24BA through sockets in mount block 38 before being re-inserted back into backrest 16. A method of installing partition assembly 12 of the present disclosure can include: Step 2A of positioning clamp jaws 34A and 34B on brace rod 36 to engage headrest posts so that panel sub-assembly 22 is located in a desired position. Partition assembly 12 is moved into proximity of backrest 16 and bench 14 so that stabilizer sub-assembly 20 is between headrest posts 24B and backrest 16. A method of installing partition assembly 12 of the present disclosure can include: Step 2B of introducing stabilizer sub-assembly 20 of partition assembly 12 to seat 10 to align clamp jaws 34A and 34B with headrest posts 24B.

Figure 8C:
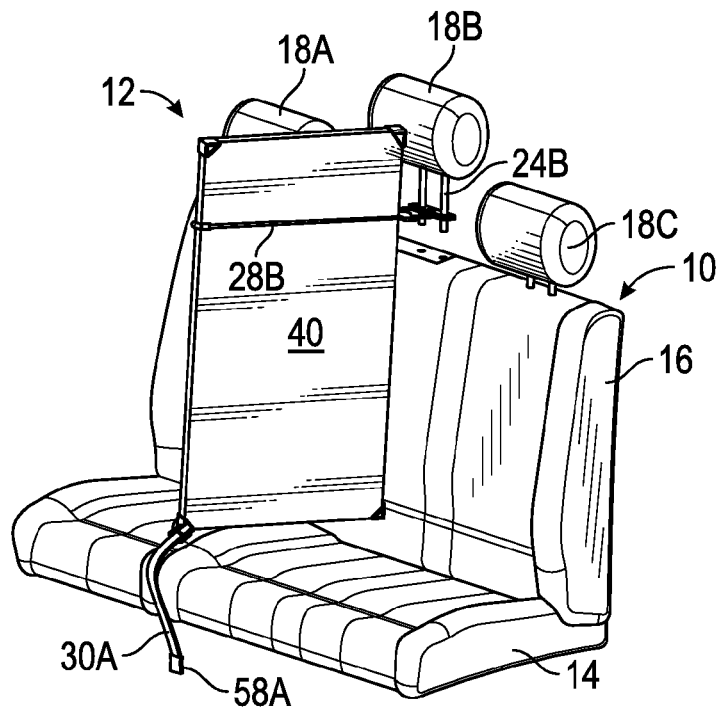
FIG. 8C is a front perspective view of the vehicle seat of FIG. 8B with a stabilizer sub-assembly connected to the headrest of the vehicle seat.

FIG. 8C is a front perspective view of vehicle seat 10 of FIG. 8B with stabilizer sub-assembly 20 connected to headrest 18B of vehicle seat 10. A method of installing partition assembly 12 of the present disclosure can include: Step 3 of passing headrest posts 24B through hooks 68A and 68B of clamp jaws 34A and 34B of clamp 33. In another example, sockets 66A and 66B of clamp jaws 34A and 34B can be slid into position along brace rod 36 to engage posts 24B after headrest 18B is positioned adjacent stabilizer sub-assembly 20.

Figure 8D:
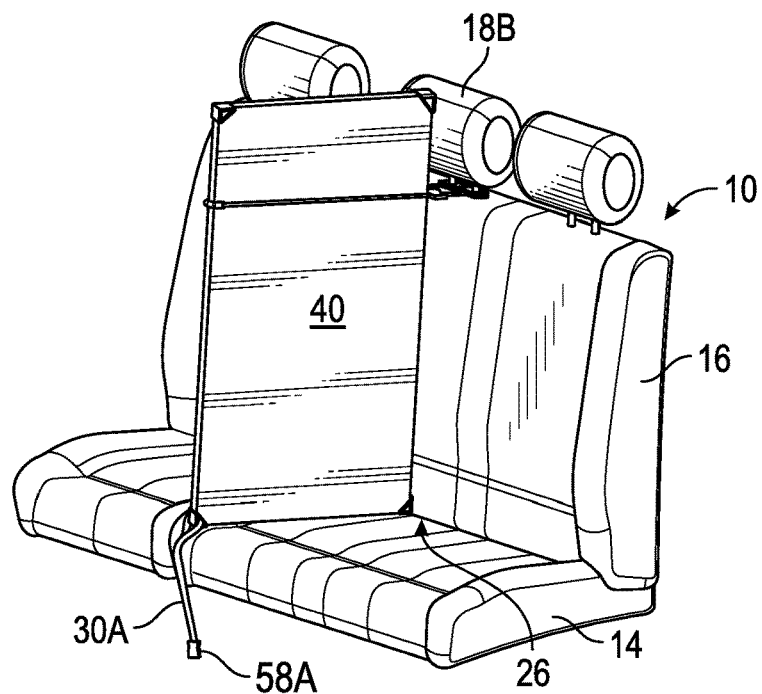
FIG. 8D is a front perspective view of the vehicle seat of FIG. 8C with the headrest connected to the vehicle seat.

FIG. 8D is a front perspective view of vehicle seat 10 of FIG. 8C with headrest 18B connected to vehicle seat 10 and first strap 30A positioned in front of seat bottom 14. A method of installing partition assembly 12 of the present disclosure can include: Step 4 A of reconnecting headrest 18B to backrest 16 by reinserting posts 24B into corresponding sockets in backrest 16. In another example, clamp jaws 34A and 34B can be slid into position along brace rod 36 to engage posts 24B with headrest 18B already connected to backrest 16. A method of installing partition assembly 12 of the present disclosure can include: Step 4 B of extending first stabilizer strap 30A across seat bottom 14 to reach the underside of vehicle seat 10.

Figure 8E:
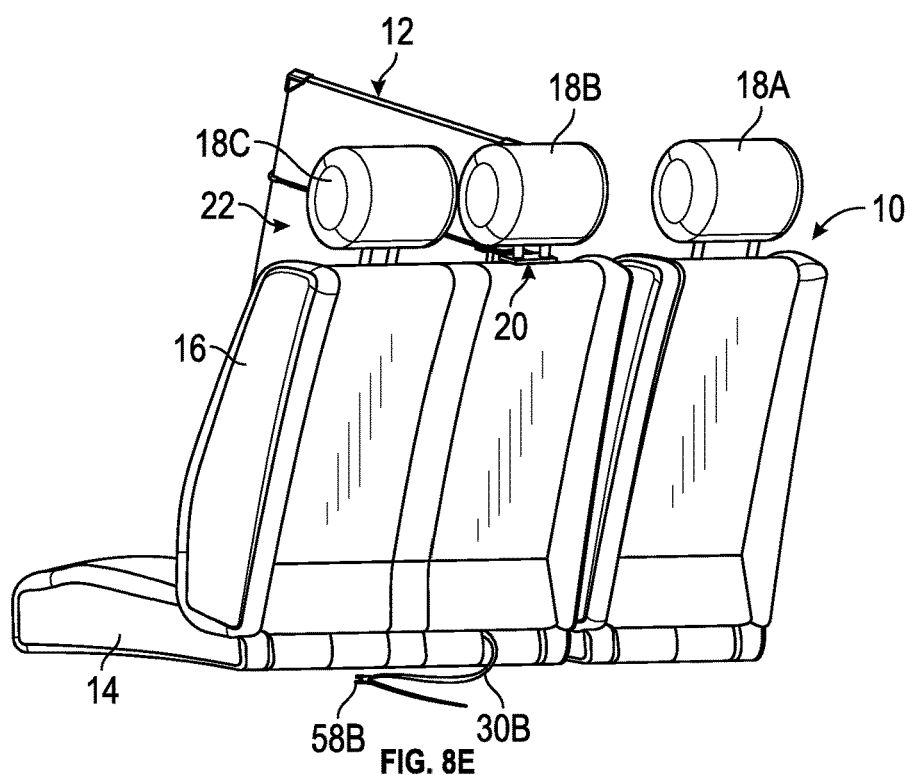
FIG. 8E is a rear perspective view of the vehicle seat of FIG. 8C with a strap of the panel sub-assembly extending between a seat bottom and a seat backrest of the vehicle seat.

FIG. 8E is a rear perspective view of vehicle seat 10 of FIG. 8C with second stabilizer strap 30B of partition assembly 12 extending between seat bottom 14 and seat backrest 16 at bite line 26. Second stabilizer strap 30B can be extended forward underneath seat bottom 14 in order to facilitate engagement with first stabilizer strap 30A. A method of installing partition assembly 12 of the present disclosure can include: Step 5 of passing second stabilizer strap 30B beneath seat bottom 14 and connecting fastener component 58B to fastener component 58A of first stabilizer strap 30A. Finally, if provided, straps 30A and 30B can be drawn tight or cinched to buttress panel sub-assembly 22 against seat bottom 14.

Partition assemblies described herein can provide convenient partitions between seating positions in a motor vehicle. The partition assemblies can be aesthetically pleasing and do not occupy a large amount of space within the seating area. For example, they are not bulky and do not include sharp edges or hard surfaces that may be injurious. The partition assemblies can also be easy to set up and take down. The stabilizer sub-assembly can be left in place with the panel sub-assembly removed for even easier installation. The stabilizer assemblies can be used for various purposes, such as privacy, isolation, seclusion, comfort, aesthetics, discipline, etc. With the partition assembly installed, passengers seated on either side of the partition can be less likely to be distracted by each other, thereby making it easier to concentrate on activities, such as reading, or providing privacy for sleeping, etc.

Various Notes & Examples

Example 1 can include or use subject matter such as a partition assembly for a motor vehicle seat, the partition assembly can comprise: a stabilizer sub-assembly configured to connect to the motor vehicle seat; and a panel sub-assembly connected to the stabilizer sub-assembly.

Example 2 can include, or can optionally be combined with the subject matter of Example 1, to optionally include a strap that can be connected to the panel sub-assembly.

Example 3 can include, or can optionally be combined with the subject matter of one or any combination of Examples 1 or 2 to optionally include a stabilizer sub-assembly that can be configured to connect to a headrest of the motor vehicle seat; and a strap that can be configured to loop around a seat bottom of the motor vehicle seat.

Example 4 can include, or can optionally be combined with the subject matter of one or any combination of Examples 1 through 3 to optionally include a stabilizer sub-assembly that can comprise a proximal connection end and a distal support end; and a panel sub-assembly that can be suspended from the stabilizer sub-assembly between the proximal connection end and the distal support end.

Example 5 can include, or can optionally be combined with the subject matter of one or any combination of Examples 1 through 4 to optionally include a stabilizer sub-assembly that can comprise: a clamp configured to connect to posts of a headrest of the motor vehicle seat at the proximal connection end; and a support rod extending from the clamp to the distal support end.

Example 6 can include, or can optionally be combined with the subject matter of one or any combination of Examples 1 through 5 to optionally include a clamp that can comprise a brace rod having a pair of hooks that slide on the brace rod.

Example 7 can include, or can optionally be combined with the subject matter of one or any combination of Examples 1 through 6 to optionally include a stabilizer sub-assembly that can comprise: a proximal stabilizer connected to the support rod for connecting to the partition panel; and a distal stabilizer connected to the support rod for connecting to the panel sub-assembly.

Example 8 can include, or can optionally be combined with the subject matter of one or any combination of Examples 1 through 7 to optionally include a stabilizer sub-assembly that can comprise: a mount block for joining the support rod to the clamp.

Example 9 can include, or can optionally be combined with the subject matter of one or any combination of Examples 1 through 8 to optionally include a panel sub-assembly that can comprise: a sheet of flexible material; and a plurality of rods connected to support the sheet.

Example 10 can include, or can optionally be combined with the subject matter of one or any combination of Examples 1 through 9 to optionally include a panel sub-assembly that can comprise: a plurality of corner braces connecting the rods.

Example 11 can include, or can optionally be combined with the subject matter of one or any combination of Examples 1 through 10 to optionally include a strap that can extend from at least one of the plurality of corner braces.

Example 12 can include, or can optionally be combined with the subject matter of one or any combination of Examples 1 through 11 to optionally include a stabilizer sub-assembly that can comprise: a pair of plastic hooks that can slide on an aluminum rod to connect to a pair of posts on a headrest; and a pair of fiberglass poles extending from the aluminum rod; and a panel sub-assembly that can comprise: a plurality of fiberglass poles joined to form a frame that can be connected to the pair of fiberglass poles; and a nylon fabric sheet braced by the plurality of fiberglass poles.

Example 13 can include or use subject matter such as a screen device for a motor vehicle seat that can comprise: a stabilizer that can comprise: a proximal end configured to fixedly attach to a headrest of the motor vehicle seat; and a distal end extending from the proximal end; a panel that can comprise: an upper end supported by the stabilizer between the proximal and distal ends; and a lower end configured to be positioned in proximity to a seat bottom of the motor vehicle seat; and a strap connected to the panel and configured to extend around the seat bottom of the motor vehicle seat.

Example 14 can include, or can optionally be combined with the subject matter of Example 13, to optionally include a panel that can comprise: a frame; and a flexible sheet braced by the frame.

Example 15 can include, or can optionally be combined with the subject matter of one or any combination of Examples 13 or 14 to optionally include a panel that can further comprise: a plurality of rods; and a plurality of corner braces connecting the rods to form the frame; wherein the flexible sheet can be connected to the plurality of rods.

Example 16 can include, or can optionally be combined with the subject matter of one or any combination of Examples 13 through 15 to optionally include a stabilizer that can comprise: a clamp assembly configured to connect to the headrest; and a support rod cantilevered from the clamp assembly.

Example 17 can include, or can optionally be combined with the subject matter of one or any combination of Examples 13 through 16 to optionally include: proximal and distal stabilizers mounted to the support rod to releasably connect to the panel.

Example 18 can include or use subject matter such a seating assembly that can comprise: a motor vehicle seat that can comprise: a seat bottom; a seat backrest coupled to the seat bottom at a bite line; and a headrest connected to the seat backrest at a post; and a partition assembly that can comprise: a stabilizer sub-assembly configured to connect to the post; a panel sub-assembly connected to the stabilizer sub-assembly; and a strap connected to the panel sub-assembly and configured to wrap around the seat bottom.

Example 19 can include, or can optionally be combined with the subject matter of Example 18, to optionally include a panel sub-assembly that can comprise: a frame; and a flexible sheet braced by the frame.

Example 20 can include, or can optionally be combined with the subject matter of one or any combination of Examples 18 or 19 to optionally include a stabilizer sub-assembly that can comprise: a clamp assembly configured to connect to the post; and a pair of support rods cantilevered from the clamp assembly and configured to support the panel sub-assembly.

Each of these non-limiting examples can stand on its own, or can be combined in various permutations or combinations with one or more of the other examples.

Although embodiments have been described with reference to specific illustrated embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A partition assembly for a motor vehicle seat, the partition assembly comprising:
 a stabilizer sub-assembly configured to connect to the motor vehicle seat, the stabilizer sub-assembly comprising:
  a proximal connection end and a distal support end;
  a clamp configured to connect to posts of a headrest of the motor vehicle seat at the proximal connection end, the clamp comprising a brace rod having a pair of hooks that slide on the brace rod; and
  a support rod extending from the clamp to the distal support end;
 a panel sub-assembly connected to the stabilizer sub-assembly, the panel sub-assembly being suspended from the stabilizer sub-assembly between the proximal connection end and the distal support end; and
 a strap connected to the panel sub-assembly.

2. The partition assembly of claim 1, wherein:
 the stabilizer sub-assembly is configured to connect to a headrest of the motor vehicle seat; and
 the strap is configured to loop around a seat bottom of the motor vehicle seat.

3. The partition assembly of claim 1, wherein the stabilizer sub-assembly further comprises:
 a proximal stabilizer connected to the support rod for connecting to the panel sub-assembly; and
 a distal stabilizer connected to the support rod for connecting to the panel sub-assembly.

4. The partition assembly of claim 1, wherein the stabilizer sub-assembly further comprises:
 a mount block for joining the support rod to the clamp.

5. The partition assembly of claim 1, wherein the panel sub-assembly comprises:
 a sheet of flexible material; and
 a plurality of rods connected to support the sheet.

6. The partition assembly of claim 5, wherein the panel sub-assembly further comprises:
 a plurality of corner braces connecting the rods.

7. The partition assembly of claim 6, wherein the strap extends from at least one of the plurality of corner braces.

8. A screen device for a motor vehicle seat, the screen device comprising:
 a stabilizer comprising:
  a proximal end configured to fixedly attach to a headrest of the motor vehicle seat; and
  a distal end extending from the proximal end;
 a panel comprising:
  an upper end supported by the stabilizer between the proximal and distal ends; and
  a lower end configured to be positioned in proximity to a seat bottom of the motor vehicle seat;
 a strap connected to the panel and configured to extend around the seat bottom of the motor vehicle seat;
 a frame;
 a flexible sheet braced by the frame;
 a plurality of rods; and
 a plurality of corner braces connecting the rods to form the frame;
 wherein the flexible sheet is connected to the plurality of rods.

9. The screen device of claim 8, wherein the stabilizer comprises:
 a clamp assembly configured to connect to the headrest; and
 a support rod cantilevered from the clamp assembly.

10. The screen device of claim 9, wherein the stabilizer further comprises:
 proximal and distal stabilizers mounted to the support rod to releasably connect to the panel.

11. A partition assembly for a motor vehicle seat, the partition assembly comprising:
 a stabilizer sub-assembly configured to connect to the motor vehicle seat, the stabilizer sub-assembly comprising:
  a proximal connection end and a distal support end;
  a clamp configured to connect to posts of a headrest of the motor vehicle seat at the proximal connection end;
  a support rod extending from the clamp to the distal support end;
  a proximal stabilizer connected to the support rod for connecting to the panel sub-assembly; and
  a distal stabilizer connected to the support rod for connecting to the panel sub-assembly;
 a panel sub-assembly connected to the stabilizer sub-assembly, the panel sub-assembly being suspended from the stabilizer sub-assembly between the proximal connection end and the distal support end; and
 a strap connected to the panel sub-assembly.

12. The partition assembly of claim 11, wherein:
 the stabilizer sub-assembly comprises:
  a pair of plastic hooks defining the clamp that slide on an aluminum rod to connect to a pair of posts on a headrest; and
  a pair of fiberglass poles including the support rod and extending from the aluminum rod;
 the panel sub-assembly comprises:
  a plurality of fiberglass poles joined to form a frame that is connected to the pair of fiberglass poles; and
  a nylon fabric sheet braced by the plurality of fiberglass poles.

13. The partition assembly of claim 11, wherein:
 the stabilizer sub-assembly is configured to connect to a headrest of the motor vehicle seat; and
 the strap is configured to loop around a seat bottom of the motor vehicle seat.

14. The partition assembly of claim 11, wherein the stabilizer sub-assembly further comprises:
 a mount block for joining the support rod to the clamp.

15. The partition assembly of claim 11, wherein the panel sub-assembly comprises:
 a sheet of flexible material; and
 a plurality of rods connected to support the sheet.

16. The partition assembly of claim 15, wherein the panel sub-assembly further comprises:
 a plurality of corner braces connecting the rods.

17. The partition assembly of claim 16, wherein the strap extends from at least one of the plurality of corner braces.

* * * * *